No. 693,165. Patented Feb. 11, 1902.
A. M. SHANNON & W. BOBBITT.
STOCK WEANER.
(Application filed Nov. 18, 1901.)
(No Model.)
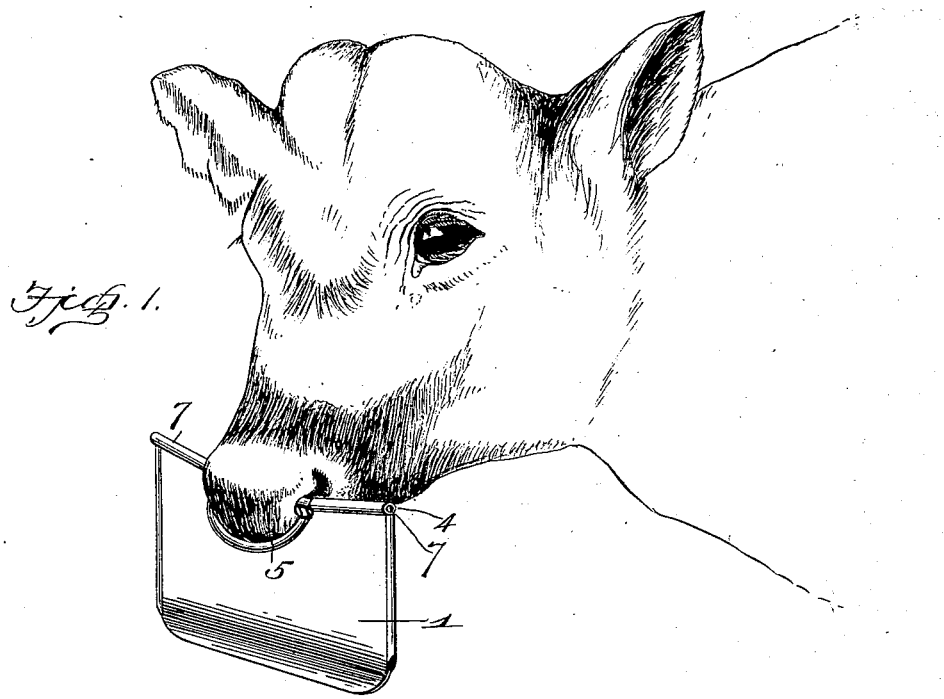
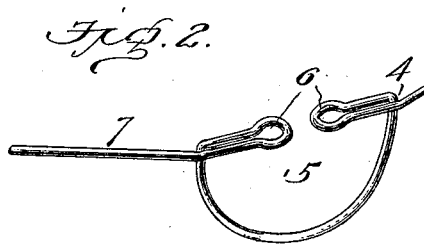
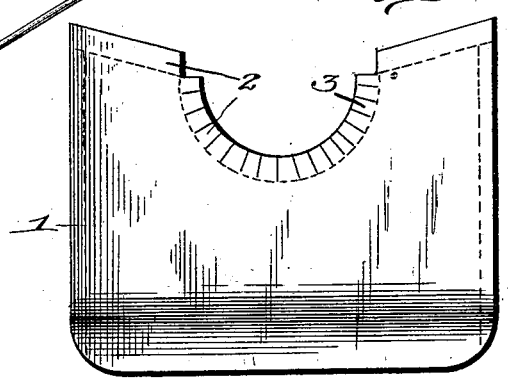
Inventors
A. M. Shannon
William Bobbitt
By A. B. Wilson & Co.
Attorneys
Witnesses

UNITED STATES PATENT OFFICE.

ALBERT M. SHANNON AND WILLIAM BOBBITT, OF LAPORTE, TEXAS.

STOCK-WEANER.

SPECIFICATION forming part of Letters Patent No. 693,165, dated February 11, 1902.

Application filed November 18, 1901. Serial No. 82,742. (No model.)

*To all whom it may concern:*

Be it known that we, ALBERT M. SHANNON and WILLIAM BOBBITT, citizens of the United States, residing at Laporte, in the county of Harris and State of Texas, have invented certain new and useful Improvements in Stock-Weaners; and we do declare the following to be a full, clear, and exact description of the invention, such as will enable others skilled in the art to which it appertains to make and use the same.

The invention relates to stock-weaners.

The object of the invention is to provide a device of this character which shall be simple of construction, durable in use, comparatively inexpensive of production, easily applied, and designed for weaning calves and preventing other stock from sucking themselves or others.

With these and others objects in view the invention consists of certain novel features of construction, combination, and arrangements of parts, which will be hereinafter more fully described, and particularly pointed out in the appended claim.

In the accompanying drawings, Figure 1 is a perspective view of our improved stock-weaner. Fig. 2 is a side elevation of the wire frame, and Fig. 3 is front view of the fender before it is connected with the wire frame.

Referring to the drawings, 1 denotes a fender, which preferably consists of a rectangular plate, the side edges of which are bent upon themselves to stiffen the plate and the upper edge of which is provided with a curved recess to accommodate the animal's nose. The wall of this recess is slitted to form tongues 2 and 3 for a purpose hereinafter to appear. The lower edge of this plate is curved outwardly, as shown, to facilitate the ready raising of the plate by the animal when in the act of eating or drinking, but which will strike the cow first when it attempts to suck.

4 denotes a wire frame, which consists of a bowed portion 5, which is fastened to the fender by the tongues being folded over the same and which is formed with rounded inwardly-projecting eyes 6, which are adapted to engage the nostrils of the animal and which terminate in laterally and upwardly extending arms 7, around which is bent the upper edge of the fender, which materially stiffens the fender at this point. The upward projection of the arms 7 and upper edge of the fender will prevent the calf licking over top of the weaner.

In use the fender is applied to the animal by engaging the inwardly-projecting eyes with the nostrils of the animal, thus allowing the nose to project through the recess, and thus allowing a free swinging movement of the fender to permit of the grazing of the animal while at the same time preventing the animal from extracting milk. We attach considerable importance to the fact that the eyes and the portions immediately contiguous thereto are formed by doubling the wire upon itself, thus materially strengthening the device at these points.

From the foregoing description, taken in connection with the accompanying drawings, the construction, mode of operation, and advantages of our invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

A stock-weaner, consisting of a fender having a recess at its upper edge, the walls of which are slitted to form tongues, a wire frame having a bowed portion around which said tongues are bent, and being provided with inwardly-projecting eyes to engage the nostrils of the animal, and with laterally-projecting arms around which the upper edge of the fender is bent, substantially as set forth.

In testimony whereof we have hereunto set our hands in presence of two subscribing witnesses.

ALBERT M. SHANNON.
WILLIAM BOBBITT.

Witnesses:
J. D. WILLIAMS,
P. P. REYNOLDS.